(12) United States Patent
Moulton

(10) Patent No.: US 6,991,718 B2
(45) Date of Patent: Jan. 31, 2006

(54) ELECTROCHEMICAL PROCESS FOR PRODUCING IONIC LIQUIDS

(75) Inventor: Roger Moulton, Austin, TX (US)

(73) Assignee: Sachem, Inc., Austin, TX (US)

(*) Notice: Subject to any disclaimer, the term of this patent is extended or adjusted under 35 U.S.C. 154(b) by 808 days.

(21) Appl. No.: 09/990,651

(22) Filed: Nov. 21, 2001

(65) Prior Publication Data

US 2003/0094380 A1 May 22, 2003

(51) Int. Cl.
*C25B 3/00* (2006.01)

(52) U.S. Cl. .................. 205/413; 205/431; 205/444

(58) Field of Classification Search ............... 205/413, 205/431, 444
See application file for complete search history.

(56) References Cited

U.S. PATENT DOCUMENTS

| | | | |
|---|---|---|---|
| 4,463,071 A | 7/1984 | Gifford et al. | 429/194 |
| 4,572,769 A | 2/1986 | Shimizu | |
| 4,776,929 A | 10/1988 | Aoyama | |
| 4,882,244 A | 11/1989 | Donahue et al. | 429/194 |
| 5,273,840 A | 12/1993 | Dominey | 429/192 |
| 5,683,832 A | 11/1997 | Bonhote et al. | 429/111 |
| 5,827,602 A | 10/1998 | Koch et al. | 429/194 |
| 5,870,275 A | 2/1999 | Shiono et al. | 361/504 |
| 5,951,845 A * | 9/1999 | Moulton | 205/746 |
| 5,965,054 A | 10/1999 | McEwen et al. | 252/62.2 |

FOREIGN PATENT DOCUMENTS

| | | |
|---|---|---|
| WO | WO 95/21871 | 8/1995 |
| WO | WO 95/21872 | 8/1995 |
| WO | WO 98/06106 | 2/1998 |
| WO | WO 99/14160 | 3/1999 |
| WO | WO 01/03211 A1 | 1/2001 |
| WO | WO 01/13379 A1 | 2/2001 |
| WO | WO 01/15175 A2 | 3/2001 |
| WO | WO000115175 A2 * | 3/2001 |
| WO | WO 01/40146 A1 | 6/2001 |

OTHER PUBLICATIONS

Freemantle, "Designer Solvents," C&EN, 32-37, Mar. 30, 1998.
Freemantle, "Eyes on Ionic Liquids," C&EN, 78:20, 37-50, May 15, 2000.
Holbrey, et al., "Ionic Liquids," Clean Products and Processes 1 (1999) 223-236, no month.
Seddon, "Room-Temperature Ionic Liquids: Neoteric Solvents for Clean Catalysis," The Queen's University of Belfast School of Chemistry WWW Server, no date.

* cited by examiner

*Primary Examiner*—Arun S. Phasge
(74) *Attorney, Agent, or Firm*—Renner, Otto, Boisselle & Sklar, LLP

(57) ABSTRACT

The present invention relates to an electrochemical process for producing ionic liquids. The ionic liquids may be hydrophilic or hydrophobic ionic liquids. The ionic liquids are made by subjecting an electrochemical cell to electrolysis.

48 Claims, No Drawings

ELECTROCHEMICAL PROCESS FOR PRODUCING IONIC LIQUIDS

FIELD OF THE INVENTION

The present invention pertains to an electrochemical process for producing ionic liquids which are useful, for example, to replace organic solvents in chemical reactions. The present invention is particularly useful for making hydrophilic ionic liquids of high purity.

BACKGROUND AND SUMMARY OF THE INVENTION

Ionic liquids are salts that are liquid at ambient or near ambient temperatures. Ionic liquids have a number of uses which include replacing organic solvents in chemical processes and reactions, extracting organic compounds from aqueous waste streams, and as electrolytes in devices such as capacitors and batteries. This is because, unlike conventional organic solvents, ionic liquids are non-volatile and non-flammable. These properties are advantageous to help reduce losses to evaporation, eliminate volatile organic emissions, and improve safety.

Other properties of ionic liquids have also proved advantageous. For example, many ionic liquids have a broad temperature range at which they remain liquid and also are stable over a broad pH range. This is beneficial for high temperature processes with a demanding pH. Further, some ionic liquid systems can be used as both a solvent and catalyst. For example, [bmim]-$Al_2Cl_7$ and [emim]-$Al_2Cl_7$ can be employed as a solvent and catalyst in Friedel-Crafts reactions wherein bmim is 1-butyl-3methylimidazolium and emim is 1-ethyl-3-methylimidazolium.

Ionic liquids are conventionally prepared by metathesis, i.e., double decomposition reaction, whereby the reaction of two compounds forms two new compounds—one of which is the ionic liquid. For example, reacting [emim]Cl with $AgNO_3$ will yield [emim]$NO_3$ and AgCl.

Unfortunately, such metathesis reactions produce a mole of waste, e.g., one mole of AgCl per mole of product. In addition, the ionic liquids often contain impurities from incomplete reactions and solvent contamination. A further problem with metathesis is that it requires the separation of the two compounds which are produced. While this can be accomplished readily when the ionic liquid is hydrophobic, it is more difficult when the ionic liquid is hydrophilic. In addition, the required reagents (e.g., AgNO3) are expensive and difficult to recycle.

For the aforementioned reasons, it would be desirable to discover a new process for preparing ionic liquids. It would further be desirable if such a process was capable of making both hydrophobic and hydrophilic ionic liquids with low amounts of waste and impurities and without the use of an organic solvent.

Advantageously, new processes have been discovered to make ionic liquids. The processes comprise using an electrochemical cell which comprises an anode and a cathode. The cell is charged with solutions and subjected to electrolysis to produce the desired ionic liquid. The ionic liquid is then recovered. Alternatively, a precursor to the ionic liquid is made in an electrochemical cell. The precursor is then converted, chemically or otherwise, to the desired ionic liquid. The instant inventive processes can produce ionic liquids having a purity of 99% or higher.

DETAILED DESCRIPTION OF THE INVENTION

As used herein "ionic liquid" means a salt comprising a cation and an anion. The salt is a liquid at ambient or near ambient temperatures.

As used herein "hydrophilic ionic liquid" means an ionic liquid which is partially or wholly miscible with water.

As used herein "hydrophobic ionic liquid" means an ionic liquid which is relatively immiscible with water, i.e., forms two phases at ambient conditions.

As used herein "composition" includes a mixture of the materials that comprise the composition, as well as, products formed by the reaction or the decomposition of the materials that comprise the composition.

As used herein a "mixture" of metals includes both an intimate mixture of two or more metals such as an alloy, as well as, one or metals coated upon one or more metals.

As used herein "derived from" means made or mixed from the specified materials, but not necessarily composed of a simple mixture of those materials. Substances "derived from" specified materials may be simple mixtures of the original materials, and may also include the reaction products of those materials, or may even be wholly composed of reaction or decomposition products of the original materials.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 and the like, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Electrochemical Cell

The processes of the instant invention all involve subjecting an electrochemical cell to electrolysis. The type of electrochemical cell will vary depending upon, for example, the starting materials, the ionic liquid to be made, the purity desired, the cathode and anode employed, and the specific method to be employed. Suitable anodes, cathodes, cell configurations, and means for dividing the cells are described in U.S. Pat. Nos. 4,714,530; 5,853,555; 5,968,338; and 5,951,845 which are incorporated by reference in their entirety. The term "electrochemical cell" includes, for example, both electrolytic cells and electrodialysis cells.

Generally, the electrochemical cell comprises one or more cathodes and one or more anodes and can be made of one electrolyzer or two or more electrolyzers in parallel or series. The cathode can be any of any size, shape, or material so long as it provides sufficient free electrons to produce the desired product. Suitable cathodes include, for example, nickel, iron, stainless steel, nickel plated titanium, graphite, carbon steel (iron) or mixtures thereof. Suitable anodes include, for example, titanium, tantalum, zirconium, hafnium, or mixtures thereof. Often the anode will have a non-passivable and catalytic film which may comprise metallic noble metals such as platinum, iridium, ruthenium, rhodium, or mixtures or oxides thereof.

The cell may also comprise a means for dividing the cell into two or more compartments. These compartments generally include a catholyte compartment which houses a cathode and a catholyte solution and an anolyte compartment which houses an anode and an anolyte solution. The means for dividing includes, for example, membranes, nanoporous materials, diaphragms, asbestos, etc. Types of dividing membranes may include cation-exchange membranes, anion exchange membranes, and bipolar membranes. The use of such means for dividing is discussed in U.S. Pat. Nos. 4,714,530; 5,853,555; 5,968,338; and 5,951,845 which are incorporated by reference in their entirety.

Solutions of the Electrochemical Cell

The processes of the present invention usually comprise charging the electrochemical cell with solutions that will form the ionic liquid or an ionic liquid precursor when the cell is subjected to electrolysis. The solutions can be introduced into the electrochemical cell in any order or even created in situ within the cell so long as the desired ionic liquid or ionic liquid precursor is formed when subjected to electrolysis.

Generally, the electrochemical cell is charged with at least two solutions. One solution, hereinafter the "first solution", is either a solution which comprises the desired cation of the ionic liquid to be produced or a solution that when subjected to electrolysis produces the desired cation. Another solution, hereinafter the "second solution", is either a solution which comprises the desired anion of the ionic liquid to be produced or a solution that when subjected to electrolysis produces the desired anion. For some applications, the desired cation may be a mixture of different cations and/or the desired anion may be a mixture of different anions. Generally, the solutions are aqueous, however, any solvent which does not react significantly under electrolysis conditions may be employed.

The concentrations of the solutions are not particularly critical so long as the solutions are sufficiently concentrated for the electrolysis reaction to occur and produce the desired ionic liquid at the desired purity. Generally, the concentration of the solutions should be at least about 0.5, preferably at least about 1, most preferably at least about 1.5 in molarity (M). On the other hand, the concentration of the solutions should generally be less than about 3, preferably less than about 2.5, most preferably less than about 2 M.

Cation of Ionic Liquid to be Produced

The desired cation of the ionic liquid to be produced includes, for example, "onium" cations. Onium cations include cations such as substituted or unsubstituted ammonium, phosphonium, and sulfonium cations. Preferred onium cations include, for example, substituted or unsubstituted N-alykl or N-aryl pyridinium, pyridazinium, pyrimidinium, pyrazinium, imidazolium, pyrazolium, thiazolium, oxazolium, triazolium, imidazolinium, methylpyrrolidinium, isothiazolium, isoxazolium, oxazolium, pyrrolium, and thiophenium. The substituents include one or more of the following groups: halo, alkyl, and aryl groups such as phenyl. In addition, two adjacent substituents may be joined together to form an alkylene radical thereby forming a ring structure converging on N. The alkyl, phenyl, and alkylene radicals may be further substituted. Another particularly preferred cation is an ammonium cation substituted by one or more groups such as alkyl and aryl groups such as phenyl. Many Such cations and substituted cations are described in U.S. Pat. Nos. 5,827,602 and 5,965,054 which are incorporated by reference in their entirety.

As described above, the desired cation of the ionic liquid may be part of a solution which comprises the desired cation of the ionic liquid to be produced or the desired cation may be produced from a solution that when subjected to electrolysis produces the desired cation. In either case, there is typically an associated anion which is preferably different from the desired anion of the ionic liquid to be produced. The type of anion is not critical so long as it does not interfere with the formation of the desired ionic liquid. Suitable anions include, for example, halide anions such as chloro, flouro, bromo, and iodo, hydroxide, ethylsulfate, triflate, formate, alkylsulfate, triflate, triflouroacetate, perflouroalkylcarboxylate, perflouroalkylsulfonate, and methylcarbonate, etc.

It is also often advantageous to employ a process wherein the solution which comprises the desired cation of the ionic liquid to be produced also comprises as the undesired anion, an anion which is converted electrochemically or otherwise to a gaseous by-product such as hydrogen, ammonia, carbon dioxide, or nitrogen. In this manner, the undesired gas bubbles from the solution and there are less undesirable ions in solution to be separated from the desired ions of the ionic liquid.

Anion of Ionic Liquid to be Produced

The desired anion of the ionic liquid to be produced can be charged to the cell as part of a solution or may be produced from a solution that when subjected to electrolysis produces the desired anion. For example, if acetate is the desired anion of the ionic liquid then an acetate solution could be employed or an adehyde or ester solution could be employed and electrochemically converted to an acetate solution.

If the desired anion is part of a solution that is charged to the cell then there is generally an associated cation that is preferably different from the desired cation of the ionic liquid to be produced. The type of associated cation is not critical so long as it does not interfere with the formation of the desired ionic liquid. Suitable associated cations include, for example, hydrogen, ammonium, sodium, phosphonium, sulfonium, potassium, etc. Examples of solutions that produce the desired anion include organic salts, inorganic salts, organic acid, and inorganic acids. Preferable solutions include aqueous solutions of acetic acid, nitric acid, and salts thereof.

It is also often advantageous to employ a process wherein the solution which comprises the desired anion of the ionic liquid to be produced also comprises as the undesired cation, a cation which is converted electrochemically or otherwise to a gaseous by-product such as hydrogen, ammonia, carbon dioxide, or nitrogen. In this manner, the undesired gas bubbles from the solution and there are less undesirable ions in solution to be separated from the desired.

Electrolysis

The amount and duration of current to be employed depends generally on the size, shape, and composition of the cell and electrodes, as well as, the concentration and nature of the solutions in the electrochemical cell. Generally, the larger the amount of current the shorter the reaction time and vice versa. However, if the amount of current is too large then undesirable side reactions may occur or power consumption may be excessive. Correspondingly, if the amount of current is too small then no reaction may occur or the reaction may be too slow. Generally, one of skill in the art may readily use electrochemical principles such as Faraday's law to determine the proper amount of current for a given cell.

The electrolysis can be conducted to produce the ionic liquid batch-wise or continuously. If electrolysis is conducted batch-wise then current is generally applied until the ionic liquid has been formed in its desired amount and purity. This can often be determined by using a means for indicating the extent of reaction. One such means is a pH meter. If the electrolysis is to be conducted on a continuous basis then the starting solutions are replenished as the reaction proceeds and the desired product may be recovered continuously. An additional step in the ionic liquid recovery process might be to remove residual acid (e.g. acetic acid) prior to evaporating the water. Acid can be removed by an anion exchange resin, among other methods.

Ionic Liquid Recovery

The ionic liquid may be recovered by any suitable means the most efficient of which may vary depending upon the type and desired purity of the ionic liquid and the type of cell. Preferable means of recovery include rotary evaporation or distillation, azeotropic distillation, crystallization, pervaporization, drying agents, and reverse osmosis.

Precursor Method

A variation of the aforementioned methods of producing ionic liquids using electrolysis involves producing a precursor solution to the ionic liquid in an electrochemical cell, converting the precursor solution to the desired ionic liquid and recovering it. Suitable precursor solutions that can be produced by electrolysis include, for example, solutions comprising anions such as hydroxide, carbonate, bicarbonate, acetate, and formate. A particularly preferable solution comprises onium hydroxides. Such processes are described, for example, in U.S. Pat. Nos. 4,714,530; 5,853,555; 5,968,338; and 5,951,845 which are incorporated by reference in their entirety. Once the precursor solution has been made via electrolysis, it can be converted by any suitable means, chemical or otherwise, to produce the desired ionic liquid. A particularly preferably conversion method employs an acid such as acetic, nitric, triflic, methanesulfonic, or sulfuric.

Characteristics of Ionic Liquids of Electrochemical Processes

The purity of ionic liquids produced by the processes of this invention are often greater than 98, preferably greater than 99, more preferably greater than 99.9%, most preferably greater than 99.99%. This means that many ionic liquids can be made with less than 100 ppm halide, e.g., chloride, and less than 20 ppm sodium impurities. This is advantageous for processes which require high purity materials such as in the electronics industry.

The following examples are not intended to limit the invention, but rather, are intended only to illustrate a few specific ways the instant invention may be employed.

EXAMPLE 1

A four compartment cell was constructed using, in order, an anode, a bipolar membrane, and anion exchange membrane, and a cation exchange membrane, and a cathode. The bipolar membrane was BP-1 manufactured by Tokuyama Soda, the Anion membrane was AMH, also by Tokuyama Soda, and the cation exchange membrane was Nafion 117, by DuPont. The cell was charged with 1 gallon each of: a 1 M NaOH solution in the first compartment, a 1 M Hydrochloric acid solution in the second compartment, a 2 M 1-Butyl-3-Methylimidazolium Cl in the third compartment, and a 0.1 M 1-Butyl-3-Methylimidazolium Hydroxide solution in the fourth compartment. The electrodes were 10×10 cm in size and the anode was constructed of Titanium coated with iridium oxide (a dimensionally stable anode, or DSA), and the cathode was a Nickel plate. The electrodes may be of either monopolar or bipolar design.

A current of 8 A was applied to the cell, and the solutions were recirculated using centrifugal pumps. Water was added to the Hydrochloric acid solution to keep its concentration at 1 M. 85% BMIM Chloride was added to the third compartment continuously to maintain a concentration of 2 M in that compartment. The current was applied until the 1-Butyl-3-Methylimidazolium hydroxide concentration in the fourth compartment had risen to 1.2 M, at which time the catholyte solution was removed from the cell. It was then neutralized with phosphoric acid and concentrated under rotary vacuum to yield the final product, 1-Butyl-3-Methylimidazolium dihydrogenphosphate. Its purity was 100 ppm chloride and 9.22% H2O.

EXAMPLE 2

In a second example, a two-compartment cell was constructed, using a DSA anode, a cation exchange membrane (Nafion 902 from DuPont) and a Ni cathode. 10 liters each of 2 M 1-Butyl-3-Methylimidazolium Chloride and 1.5 M acetic acid were added to the two compartments, and 10 amps current was applied to the cell until the pH of the solution containing the acetic acid had risen to 7.0. The catholyte was then removed from the cell, and the 1-Butyl-3-Methylimidazolium Acetate product isolated by removing the water by rotary distillation as described above. The yield was 70% and had 329 ppm sodium and 893 ppm Cl. The product also contained 19% water, which could not easily be removed by vacuum evaporation. However, the 1-Butyl-3-Methylimidazolium Acetate product could be further dried by azeotropic distillation. The wet product was heated to reflux in a round bottom flask, fitted with a Dean-Stark trap with benzene was added. When no more water was collected in the trap, the benzene was removed by rotoevaporation. The product now contained <0.5% H2O.

EXAMPLE 3

In a third example, a three-compartment cell was constructed using a anode, a cation exchange membrane, an anion exchange membrane, and a cathode. 3 Liters of a 2 M solution of 1-butyl-3-methylimidazolium chloride was added to the first compartment, and 3 liters of a 3 M solution of HNO3 was added to the second compartment, and 0.5 liters of 1 M KOH was added to the third compartment. Electricity was applied to the cell, until the pH of the nitric acid-containing solution had risen to 7.0, whereupon the electrolysis was stopped and the second solution was removed from the cell. 85% BMIM Chloride was added continuously to the first compartment to maintain a concentration of 2 M in that compartment during the electrolysis. The second solution was passed through a weakbase ion exchange resin to remove residual nitric acid, then evaporated under rotary vacuum. The product, 1-butyl-3-methylimidazolium nitrate was obtained in 51% yield and contained 418 ppm potassium, 852 ppm chloride,and 3.24% water.

EXAMPLE 4

In a fourth example, a four-compartment cell is constructed using, in order, an anode, a bipolar membrane, and anion exchange membrane, and a cation exchange membrane, and a cathode. The bipolar membrane is BP-1 manufactured by Tokuyama Soda, the Anion membrane is AMH, also by Tokuyama Soda, and the cation exchange membrane is Nafion 117, by DuPont. The cell is charged with 1 gallon each of: a 1 M NaOH solution in the first compartment, a 1 M solution of Hydrochloric acid solution in the second compartment, a 2 M solution of N-methyl-N-propylpyrollidinium Chloride in the third compartment, and a 2 M solution of tetrafluoroboric acid in the fourth compartment. The electrodes are 10×10 cm in size and the anode is constructed of Titanium coated with iridium oxide (a dimensionally stable anode, or DSA), and the cathode is a Nickel plate. The electrodes may be of either monopolar or bipolar design.

A current of 10 A is applied to the cell, and the solutions are recirculated using centrifugal pumps. Water is added to the Hydrochloric acid solution to keep its concentration at 1 M. 85% N-methyl-N-propylpyrollidinium Chloride is added to the third compartment continuously to maintain a concentration of 2 M in that compartment. The catholyte solution is kept in the cell until the pH rises to 7.0 at which time it is removed. That solution is then heated under rotary vacuum to yield the final product N-methyl-N-propylpyrollidinium tetrafluroborate.

EXAMPLE 5

In a fifth example, a four-compartment cell is constructed using, in order, an anode, a bipolar membrane, and anion exchange membrane, and a cation exchange membrane, and a cathode. The bipolar membrane was BP-1 manufactured by Tokuyama Soda, th4 Anion membrane is AMH, also by Tokuyama Soda, and the cation exchange membrane is Nafion 117, by DuPont. The cell is charged with 1 gallon each of: a 1 M NaOH solution in the first compartment, a 1 M solution of Hydrochloric acid solution in the second compartment, a 2 M solution of tetrakis(hydroxymethyl) phosphonium Chloride in the third compartment, and a saturated solution of carbon dioxide in the fourth compartment (made by continuously bubbling CO2 in the solution). The electrodes are 10×10 cm in size and the anode is constructed of Titanium coated with iridium oxide (a dimensionally stable anode, or DSA), and the cathode is a Nickel plate. The electrodes may be of either monopolar or bipolar design.

A current of 10 A is applied to the cell, and the solutions are recirculated using centrifugal pumps. Water is added to the Hydrochloric acid solution to keep its concentration at 1 M. Solid tetrakis(hydroxymethyl)phosphonium Chloride is added to the third compartment continuously to maintain a concentration of 2 M in that compartment. The electrolysis is continued until a 1 M tetrakis(hydroxymethyl)phosphonium bicarbonate solution forms (pH 8.0) in the catholyte, at which time it is removed. The catholyte is then neutralized with acetic acid, which evolves CO2 gas and produces an aqueous solution of tetrakis(hydroxymethyl)phosphonium acetate. That solution is then heated under rotary vacuum to yield the final product, tetrakis(hydroxymethyl)phosphonium Acetate.

EXAMPLE 6

In a sixth example, a four-compartment cell is constructed using, in order, a cation exchange membrane, an anion exchange membrane, a cation exchange membrane, an anion exchange membrane, and a cation exchange membrane. The anion membranes were AMH by Tokuyama Soda, and the cation exchange membranes were Nafion 117, by DuPont. The cell is charged with 1 gallon each of: a 0.1 M sodium chloride solution in the first compartment, a 2 M solution of N-butylpyridinium Chloride in the second compartment, a 0.1 M solution of N-butylpyridinium nitrate in the third compartment, and a 2 M solution of sodium nitrate in the fourth compartment. An electric current is passed through the stack of cell compartments using electrodes in external compartments. The electrodes are 10×10 cm in size and the anode is constructed of Titanium coated with iridium oxide (a dimensionally stable anode, or DSA), which is inserted adjacent to the first compartment and separated from it by a bipolar membrane (BP-1, by Tokuyama Soda). The cathode is a Nickel plate, inserted adjacent to the fourth compartment, and separated from it by a bipolar membrane. The electrodes may be of either monopolar or bipolar design. The electrode compartments are filled with 1 M sodium hydroxide solution.

A current of 10 A is applied to the cell, and the solutions recirculated using centrifugal pumps. Water is added to the Hydrochloric acid solution to keep its concentration at 1 M. An 85% solution of N-butylpyridinium Chloride is added to the second compartment continuously to maintain a concentration of 2 M in that compartment. A concentrated solution of sodium acetate is added to the fourth compartment to maintain its concentration at 2 M. The solution in the third compartment is kept in the cell until it reached 2 M N-butylpyridinium nitrate, at which time it was removed. That solution was then heated under rotary vacuum to yield the final product, N-butylpyridinium nitrate.

EXAMPLE 7

In a seventh example, a four-compartment cell is constructed using, in order, a anode, a bipolar membrane, an anion exchange membrane, a cation exchange membrane, and a cathode. The anion membranes are AMH by Tokuyama Soda, the bipolar membrane is BP-1 from Tokuyama Soda, and the cation exchange membranes are Nafion 117, by DuPont. The cell is charged with 1 gallon each of: a 1.0 M sodium hydroxide solution in the first compartment, 1 M Hydrochloric acid in the second compartment, a 2 M solution of 1-butyl-3-methylimidazolium Chloride in the third compartment, and a 0.1 M solution of 1-butyl-3-methylimidazolium formate in the fourth compartment. An electric current is passed through the stack of cell compartments using electrodes in external compartments. The electrodes are 10×10 cm in size and the anode is constructed of Titanium coated with iridium oxide (a dimensionally stable anode, or DSA), which is inserted adjacent in the first. The cathode is a Nickel plate, inserted in the fourth compartment. The electrodes may be of either monopolar or bipolar design.

A steady stream of carbon dioxide gas is bubbled continuously through the fourth solution. A current of 10 A is applied to the cell, and the solutions are recirculated using centrifugal pumps. Water is added to the Hydrochloric acid solution to keep its concentration constant. 85% 1-butyl-3-methylimidazolium Chloride is added to the third compartment continuously to maintain a concentration of 2 M in that compartment. The 1-butyl-3-methylimidazolium formate concentration is allowed to rise in the fourth compartment until it reaches 2 M, whereupon water is added to maintain its concentration at 2 M. The overflow of the fourth compartment was removed from the cell, and heated under rotary vacuum to yield the final product, 1-butyl-3-methylimidazolium formate.

EXAMPLE 8

In an eighth example, a four-compartment cell is constructed using, in order, a anode, a bipolar membrane, an anion exchange membrane, a cation exchange membrane, and a cathode. The anion membranes are AMH by Tokuyama Soda, the bipolar membrane is BP-1 from Tokuyama Soda, and the cation exchange membranes are Nafion 117, by DuPont. The cell is charged with 1 gallon each of: a 1.0 M sodium hydroxide solution in the first compartment, 1 M Hydrochloric acid in the second compartment, a 2 M solution of (2-oxo)-propyl-3-methylimidazolium Chloride in the third compartment, and a 0.1 M solution of (2-hydroxy)propyl-3-methylimidazolium formate in the fourth compartment. An electric current is passed through the stack of cell compartments using electrodes in external compartments. The electrodes were 10×10 cm in size and the anode is constructed of Titanium coated with iridium oxide (a dimensionally stable anode, or DSA), which is inserted adjacent in the first. The cathode is a Nickel plate, inserted in the fourth compartment. The electrodes may be of either monopolar or bipolar design.

A steady stream of carbon dioxide gas is bubbled continuously through the fourth solution. A current of 10 A is applied to the cell, and the solutions are recirculated using centrifugal pumps. Water is added to the Hydrochloric acid solution to keep its concentration constant. 85% (2-oxo)-propyl-3-methylimidazolium Chloride is added to the third compartment continuously to maintain a concentration of 2 M in that compartment. (2-hydroxy)propyl-3-methylimidazolium formate concentration is allowed to rise in the fourth compartment until it reached 2 M, whereupon water is added to maintain its concentration at 2 M. The overflow of the fourth compartment is removed from the cell, and heated under rotary vacuum to yield the final product, (2-hydroxy) propyl-3-methylimidazolium formate.

EXAMPLE 9

In a ninth example, a four-compartment cell is constructed using, in order, a anode, a bipolar membrane, an anion exchange membrane, a cation exchange membrane, and a cathode. The anion membranes are AMH by Tokuyama Soda, the bipolar membrane was BP-1 from Tokuyama Soda, and the cation exchange membranes were Nafion 117, by DuPont. The cell is charged with 1 gallon each of: a 1.0 M sodium hydroxide solution in the first compartment, 1 M Hydrochloric acid in the second compartment, a 2 M solution of (2-oxo)-propyl-3-methylimidazolium Chloride in the third compartment, and a 2 M solution of sulfuric acid is added to the fourth compartment. An electric current is passed through the stack of cell compartments using electrodes in external compartments. The electrodes are 10×10 cm in size and the anode is constructed of Titanium coated with iridium oxide (a dimensionally stable anode, or DSA), which is inserted adjacent in the first. The cathode is a Nickel plate, inserted in the fourth compartment. The electrodes may be of either monopolar or bipolar design.

A current of 10 A is applied to the cell, and the solutions are recirculated using centrifugal pumps. Water is added to the Hydrochloric acid solution to keep its concentration constant. 85% (2-oxo)-propyl-3-methylimidazolium Chloride is added to the third compartment continuously to maintain a concentration of 2 M in that compartment. (2-hydroxy)propyl-3-methylimidazolium hydrogen sulfate concentration is allowed to rise in the fourth compartment until all the H2SO4 had been consumed. The solution is then removed from the cell, and heated under rotary vacuum to yield the final product, (2-hydroxy)propyl-3-methylimidazolium hydrogen sulfate.

What is claimed is:

1. A process for preparing an ionic liquid in an electrochemical cell which comprises an anode and a cathode, the process comprises:
   (1) charging the cell with a first solution comprising the desired cation for the ionic liquid to be produced and a second solution comprising the desired anion for the ionic liquid to be produced;
   (2) subjecting the cell to electrolysis to produce the desired ionic liquid in solution; and
   (3) recovering the desired ionic liquid from the solution.

2. The process of claim 1 wherein the first solution comprises an aqueous solution of an onium sail.

3. The process of claim 2 wherein the onium salt comprises a cation selected from the group consisting of substituted or unsubstituted ammonium, phosphonium, and sulfonium.

4. The process of claim 3 wherein the cation is selected from the group consisting of substituted or unsubstituted pyridinium, pyridazinium pyrimidinium, pyrazinium, imidazolium, pyrazolium, thiazolium, oxazolium, triazolium, imidazolinium, methylpyrrolidinium, isothiazolium, isoxazolium, oxazolium, pyrrolium, and thiophenium.

5. The process of claim 3 wherein the cation is an ammonium cation substituted by one more groups selected from the group consisting of alkyl and aryl groups.

6. The process of claim 2 wherein the onium salt comprises an anion selected from the group consisting of halide, hydroxide, formate, alkyl sulfate, triflate, triflouroacetate, perflouroalkylcarboxylate, perflouroalkylsulfonate, and methylcarbonate.

7. The process of claim 1 wherein the second solution is an aqueous solution.

8. The process of claim 7 wherein the aqueous solution is selected from the group consisting of organic salts, inorganic salts, organic acids, and inorganic acids.

9. The process of claim 8 wherein the aqueous solution is selected from the group consisting of acetic acid, nitric acid, and salts thereof.

10. The process of claim 1 wherein the ionic liquid is a hydrophilic ionic liquid.

11. The process of claim 1 wherein the ionic liquid is recovered from the ionic liquid in solution by evaporation, reverse osmosis, pervaporization, crystallization, distillation, azeotropic, and drying agents.

12. The process of claim 11 wherein the ionic liquid is recovered from the ionic liquid in solution by evaporation.

13. The process of claim 1 wherein the electrochemical cell is divided into two or more compartments by a means for dividing.

14. The process of claim 13 wherein the means for dividing is selected from the group consisting of a membrane, a nanoporous material, a diaphragm, and asbestos.

15. The process of claim 14 wherein the membrane is selected from the group consisting of a cation-exchange membrane, an anion exchange membrane, and a bipolar membrane.

16. The process of claim 1 wherein a gaseous by-product is produced.

17. The process of claim 16 wherein the gaseous by-product is hydrogen, ammonia, carbon dioxide, or nitrogen.

18. The process of claim 1 wherein the ionic liquid recovered from the solution comprises the desired cation and the desired anion.

19. A process for preparing an ionic liquid in an electrochemical cell which comprises an anode and a cathode, the process comprises:

(1) charging the cell with a first solution comprising the desired cation for the ionic liquid to be produced and a second solution comprising the desired anion for the ionic liquid to be produced;
(2) subjecting the cell to electrolysis to produce the desired ionic liquid in solution; and
(3) recovering the ionic liquid,
wherein the hydrophilic ionic liquid is selected from the group consisting of BMIM acetate, BMIM nitrate, and BMIM triflate.

20. A process for preparing an ionic liquid in an electrochemical cell which comprises an anode and a cathode, the process comprises:
(1) charging the cell with (a) a first solution that when subjected to electrolysis produces the desired cation for the ionic liquid to be produced and (b) a second solution that when subjected to electrolysis produces the desired anion for the ionic liquid to be produced;
(2) subjecting the cell to electrolysis to produce the desired ionic liquid in solution; and
(3) recovering the desired ionic liquid from the solution.

21. The process of claim 20 wherein the desired cation for the ionic liquid to be produced comprises an onium cation.

22. The process of claim 21 wherein the onium cation is selected from the group consisting of substituted or unsubstituted ammonium, phosphonium, and sulfonium.

23. The process of claim 22 wherein the cation is selected from the group consisting of substituted or unsubstituted pyridinium, pyridazinium, pyrimidinium, pyrazinium, imidazolium, pyrazolium, thiazolium, oxazolium, triazolium, imidazolinium, methylpyrrolidinium, isothiazolium, isoxazolium, oxazolium, pyrrolium, and thiophenium.

24. The process of claim 20 wherein the second solution is an aqueous solution selected from the group consisting of organic salts, inorganic salts, organic acids, and inorganic acids.

25. The process of claim 20 wherein the ionic liquid is a hydrophilic ionic liquid.

26. The process of claim 20 wherein a gaseous by-product is produced.

27. The process of claim 20 wherein the ionic liquid recovered from the solution comprises the desired cation and the desired anion.

28. A process for preparing an ionic liquid in an electrochemical cell which comprises an anode and a cathode, the process comprises:
(1) charging the cell with (a) a first solution comprising the desired cation for the ionic liquid to be produced and (b) a second solution that when subjected to electrolysis produces the desired anion for the ionic liquid to be produced;
(2) subjecting the cell to electrolysis to produce the desired ionic liquid in solution; and
(3) recovering the desired ionic liquid from the solution.

29. The process of claim 28 wherein the desired cation for the ionic liquid to be produced comprises an onium cation.

30. The process of claim 29 wherein the onium cation is selected from the group consisting of substituted or unsubstituted ammonium, phosphonium, and sulfonium.

31. The process of claim 30 wherein the cation is selected from the group consisting of substituted or unsubstituted pyridinium, pyridazinium, pyrimidinium, pyrazinium, imidazolium, pyrazolium, thiazolium, oxazolium, triazolium, imidazolinium, methylpyrrolidinium, isothiazolium, isoxazolium, oxazolium, pyrrolium, and thiophenium.

32. The process of claim 28 wherein the second solution is an aqueous solution selected from the group consisting of organic salts, inorganic salts, organic acids, and inorganic acids.

33. The process of claim 28 wherein the ionic liquid is a hydrophilic ionic liquid.

34. The process of claim 28 wherein a gaseous by-product is produced.

35. The process of claim 28 wherein the ionic liquid recovered from the solution comprises the desired cation and the desired anion.

36. A process for preparing an ionic liquid in an electrochemical cell which comprises an anode and a cathode, the process comprises:
(1) charging the cell with (a) a first solution that when subjected to electrolysis produces the desired cation for the ionic liquid to be produced and (b) a second solution comprising the desired anion for the ionic liquid to be produced;
(2) subjecting the cell to electrolysis to produce the desired ionic liquid in solution; and
(3) recovering the desired ionic liquid from the solution.

37. The process of claim 36 wherein the desired cation for the ionic liquid to be produced comprises an onium cation.

38. The process of claim 37 wherein the onium cation is selected from the group consisting of substituted or unsubstituted ammonium, phosphonium, and sulfonium.

39. The process of claim 38 wherein the cation is selected from the group consisting of substituted or unsubstituted pyridinium, pyridazinium, pyrimidinium, pyrazinium, imidazolium, pyrazolium, thiazolium, oxazolium, triazolium, imidazolinium, methylpyrrolidinium, isothiazolium, isoxazolium, oxazolium, pyrrolium, and thiophenium.

40. The process of claim 36 wherein the second solution is an aqueous solution selected from the group consisting of organic salts, inorganic salts, organic acids, and inorganic acids.

41. The process of claim 36 wherein the ionic liquid is a hydrophilic ionic liquid.

42. The process of claim 36 wherein a gaseous by-product is produced.

43. The process of claim 36 wherein the ionic liquid recovered from the solution comprises the desired cation and the desired anion.

44. A process for preparing an ionic liquid, the process comprises:
(1) producing a precursor solution to the ionic liquid in an electrochemical cell;
(2) converting the precursor solution to a solution of the desired ionic liquid in the electrochemical cell; and
(3) recovering the desired ionic liquid from the solution.

45. The process of claim 44 wherein the precursor solution comprises anions selected from the group consisting of hydroxide, carbonate, bicarbonate, acetate, and formate.

46. The process of claim 44 wherein the conversion comprises employing an acid.

47. The process of claim 46 wherein the acid is selected from the group consisting of acetic, nitric, triflic, methanesulfonic, and sulfuric.

48. The process of claim 44 wherein the desired ionic liquid recovered from the solution comprises a desired cation and a desired anion.

* * * * *

UNITED STATES PATENT AND TRADEMARK OFFICE
CERTIFICATE OF CORRECTION

PATENT NO. : 6,991,718 B2
APPLICATION NO. : 09/990651
DATED : January 31, 2006
INVENTOR(S) : Roger Moulton It is certified that error appears in the above-identified patent and that said Letters Patent is hereby corrected as shown below:

Col. 10, Ln. 13, please replace "sail" with --salt--.
Col. 10, Ln. 45, please replace "azeotropic," with --azeotropic distillation,--.

Signed and Sealed this

Twelfth Day of June, 2007

JON W. DUDAS
*Director of the United States Patent and Trademark Office*